United States Patent [19]
Van der Meer et al.

[11] 3,934,713
[45] Jan. 27, 1976

[54] METHOD AND APPARATUS FOR PALLETIZING ARTICLES

[75] Inventors: Richard H. Van der Meer, Golden; Dan A. Gabrielson, Lakewood, both of Colo.

[73] Assignee: Ball Corporation, Muncie, Ind.

[22] Filed: Aug. 2, 1971

[21] Appl. No.: 168,237

[52] U.S. Cl. ............... 198/34; 214/6 N; 214/6 P
[51] Int. Cl.² ......................... B65G 47/26
[58] Field of Search ......... 214/6 P, 6 M, 6 N, 6 DK, 214/6 BA; 198/34

[56] References Cited
UNITED STATES PATENTS

| | | | |
|---|---|---|---|
| 3,178,007 | 4/1965 | Standley et al. | 198/34 |
| 3,424,293 | 1/1969 | Deutschlander | 198/34 |
| 3,442,401 | 5/1969 | Wolfe et al. | 214/6 P |
| 3,482,674 | 12/1969 | Wiseman | 198/34 |
| 3,570,685 | 3/1971 | Carlson | 214/6 DK |
| 3,575,278 | 4/1971 | Hoffman | 198/34 |
| 3,587,876 | 6/1971 | Dahlem et al. | 214/6 P |
| 3,612,299 | 10/1971 | Shaw et al. | 214/6 P |

*Primary Examiner*—Robert J. Spar
*Assistant Examiner*—Leslie J. Paperner
*Attorney, Agent, or Firm*—James D. Haynes

[57] ABSTRACT

A method and apparatus for palletizing articles such as, for example, hollow cylindrical containers or the like is disclosed herein and includes an apparatus section positionable adjacent a support member such as a pallet and defining a receiving station and a sweep station for receiving a plurality of the containers and transferring the same to the support member. A conveyor extending from the receiving station into the sweep station and terminating adjacent the pallet is adapted for continuous movement during the operation of the apparatus so as to convey a first group of the containers from the receiving station to the sweep station and to aid in the transfer of the first group from the sweep station onto the pallet. A first overhead assembly, positioned above the sweep station and adapted to move along a predetermined at least partially angularly deviating endless path, is provided for engaging behind and with the group of containers located at the sweep station for pushing the group onto the pallet. In addition, a second overhead assembly positioned above the conveyor and in a vertical plane separating the receiving and sweep stations is provided for allowing initial conveyance of a second group of containers onto the sweep station after beginning the transfer of said first group onto said pallet but before completion thereof.

1 Claim, 5 Drawing Figures

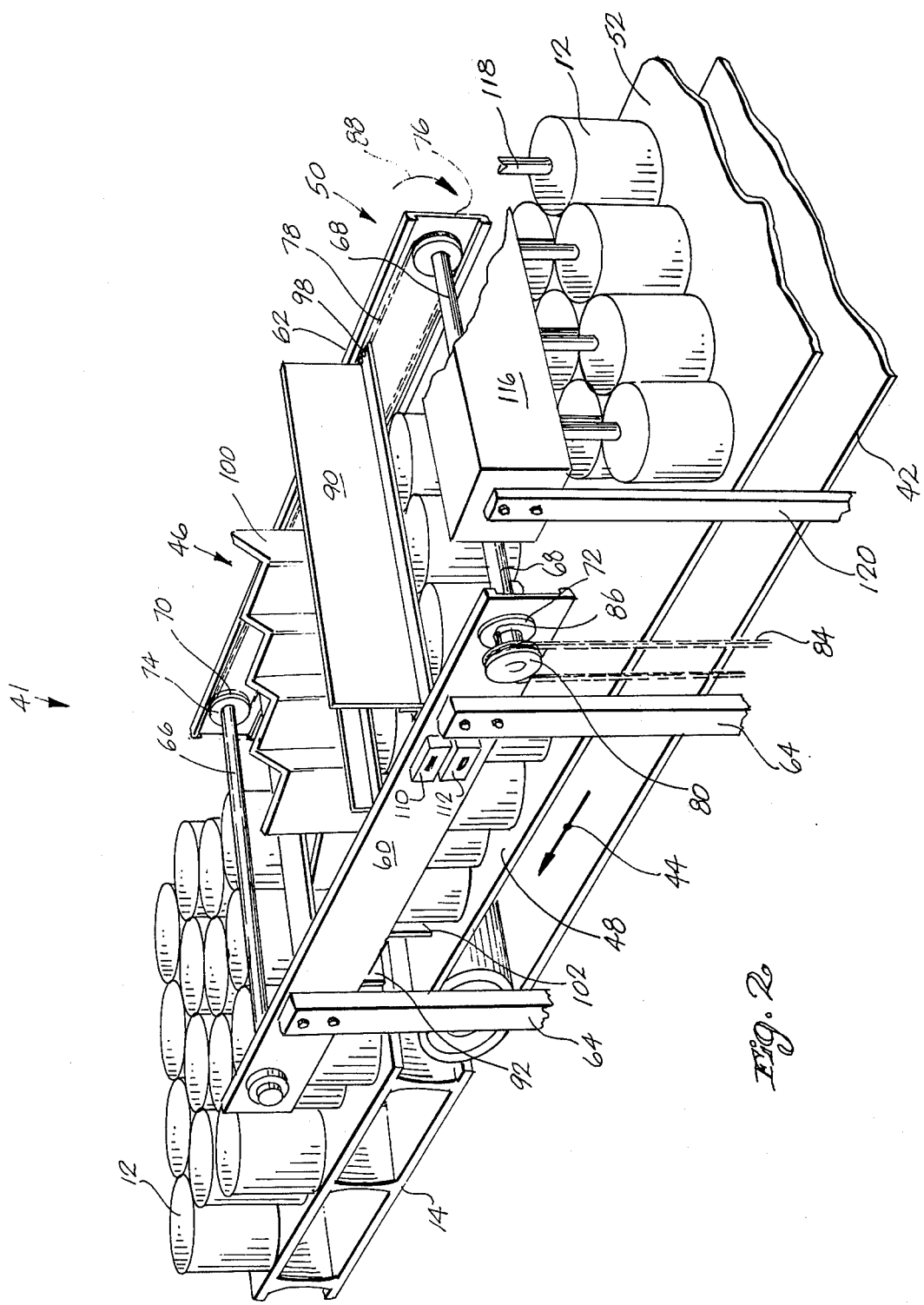

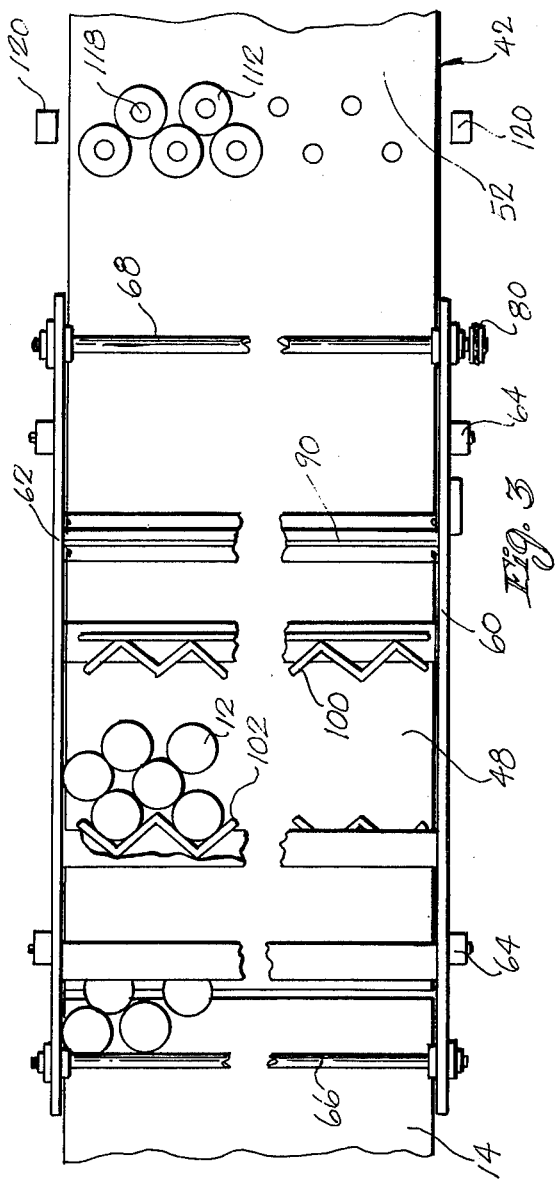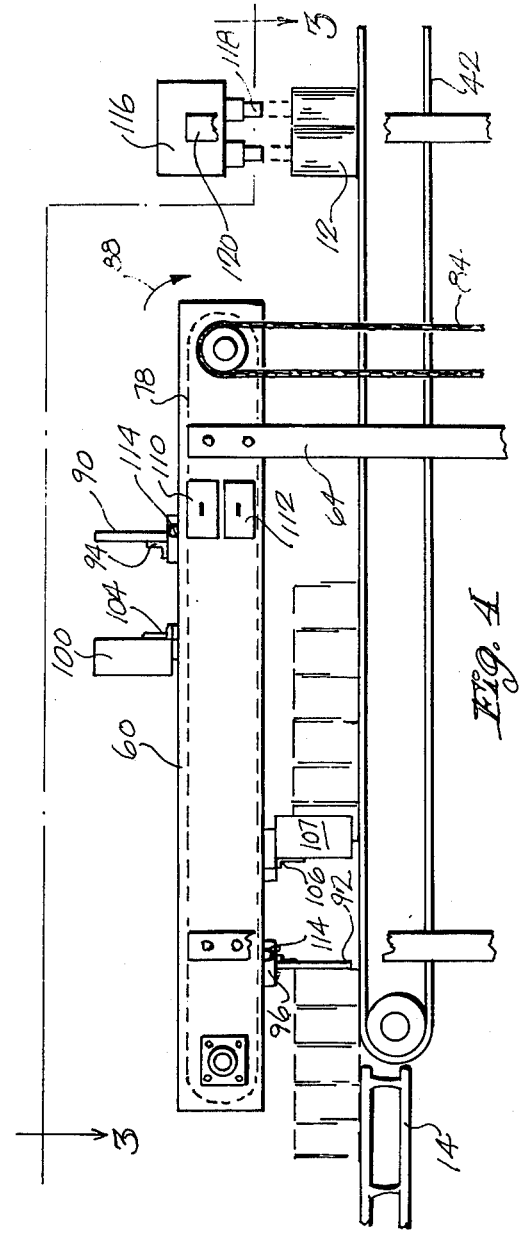

METHOD AND APPARATUS FOR PALLETIZING ARTICLES

BACKGROUND OF THE INVENTION

1. Field of the Invention

This invention relates generally to a method and apparatus for transferring articles from one area to another and more particularly to a method and apparatus for palletizing articles such as, for example, beverage cans or the like.

2. Description of the Prior Art

In todays society of highly automated mass production, the importance of minimizing production time and expensive down time is readily apparent. This is especially true, for example, in the high speed automated manufacturing of articles such as beverage containers. In this regard, large sums of money have heretofore been expended in the research and development of more efficient, economical and rapid ways of producing such articles, thereby resulting in highly complex machinery and controls for the automation thereof.

While the aforedescribed machinery so developed has been quite successful for the use intended, that is, for mass producing beverage containers in a rapid and economical fashion, it has been found, heretofore, that many improvements can be made to the method and machinery utilized in handling finished products. Today, for example, many of the known palletizers which are utilized in finished product handling, especially the handling of cylindrical containers such as beverage cans or the like, have been found not to be completely satisfactory in keeping pace with the production machinery used in conjunction therewith. Many of these palletizers do not, for example, have the capability of overlapping the various successive steps required in transferring layered groups of containers from a finished product point and ultimately onto an awaiting pallet. Rather, in many cases, complete transfer of one layer of containers must be carried out before transfer of a following layer can be initiated. This, of course, can slow down the overall production and handling process, thereby diluting many of the advantages in rapidity of the manufacturing apparatus.

SUMMARY OF THE INVENTION

This invention provides a heretofore unavailable improvement over known palletizing methods and apparatus in that it provides for a more dependable and accurate system for rapidly transferring layered groups of articles such as, for example, cylindrical beverage containers from a finished article point to a support member such as a pallet. Briefly, the system, provided in accordance with the present invention, conveys a first group of articles from an article receiving station to a transfer station, thereafter transfers said first group of articles on to a support member and before completing the transfer of said first group conveys a second group of articles from the receiving station to the transfer station.

Accordingly, an object of the present invention is to provide a new and improved article transferring apparatus which is uncomplex in design, dependable in use, and rapid in operation.

Another object of the present invention is to provide a new and improved apparatus for transferring groups of articles such as beverage cans from a finished article point to a support member such as a pallet.

Still another object of the present invention is to provide a new and improved apparatus for transferring groups of articles from a finish article point to a support member such as a pallet, which apparatus minimizes undue back-log of finished articles prior to the palletization thereof.

Yet another object of the present invention is to provide a new and improved article transferring apparatus which, during the transfer of one group of articles from a first point to the second point, initiates conveyance of a second group of articles from an article receiving point to the first point so as to minimize the time required in transferring a plurality of such groups.

Yet another object of the present invention is to provide a new and improved apparatus for transferring groups of articles from one point to another wherein said apparatus arranges the groups of articles in a predetermined pattern.

A further object of the present invention is to provide a palletizing apparatus including a new and improved assembly for aiding in the direct transfer of articles such as beverage cans onto a support member such as a pallet.

Still a further object of the present invention is to provide a palletizing apparatus including a new and improved article transfer assembly which is positioned over and engages behind groups of articles to be transferred for pushing said groups toward a support member such as a pallet.

Yet a further object of the present invention is to provide a new and improved palletizing apparatus for regulating the movement of articles between an article receiving station, pallet sweep station and an awaiting pallet.

These and other objects and features of the present invention will become more apparent from the following descriptions.

BRIEF DESCRIPTION OF THE DRAWINGS

In the Drawings:

FIG. 2 is a perspective view of a receiving and transfer assembly constructed in accordance with the present invention and utilized with the palletizing apparatus illustrated in FIG. 1;

FIG. 3 is a partially broken-away top view of the assembly of FIG. 2;

FIG. 4 is a partially broken-away side view of the assembly illustrated in FIG. 2; and FIG. 5 is an enlarged and partially broken-away perspective view of a component utilized in the assembly of FIG. 2.

DETAILED DESCRIPTION

Figure 1:
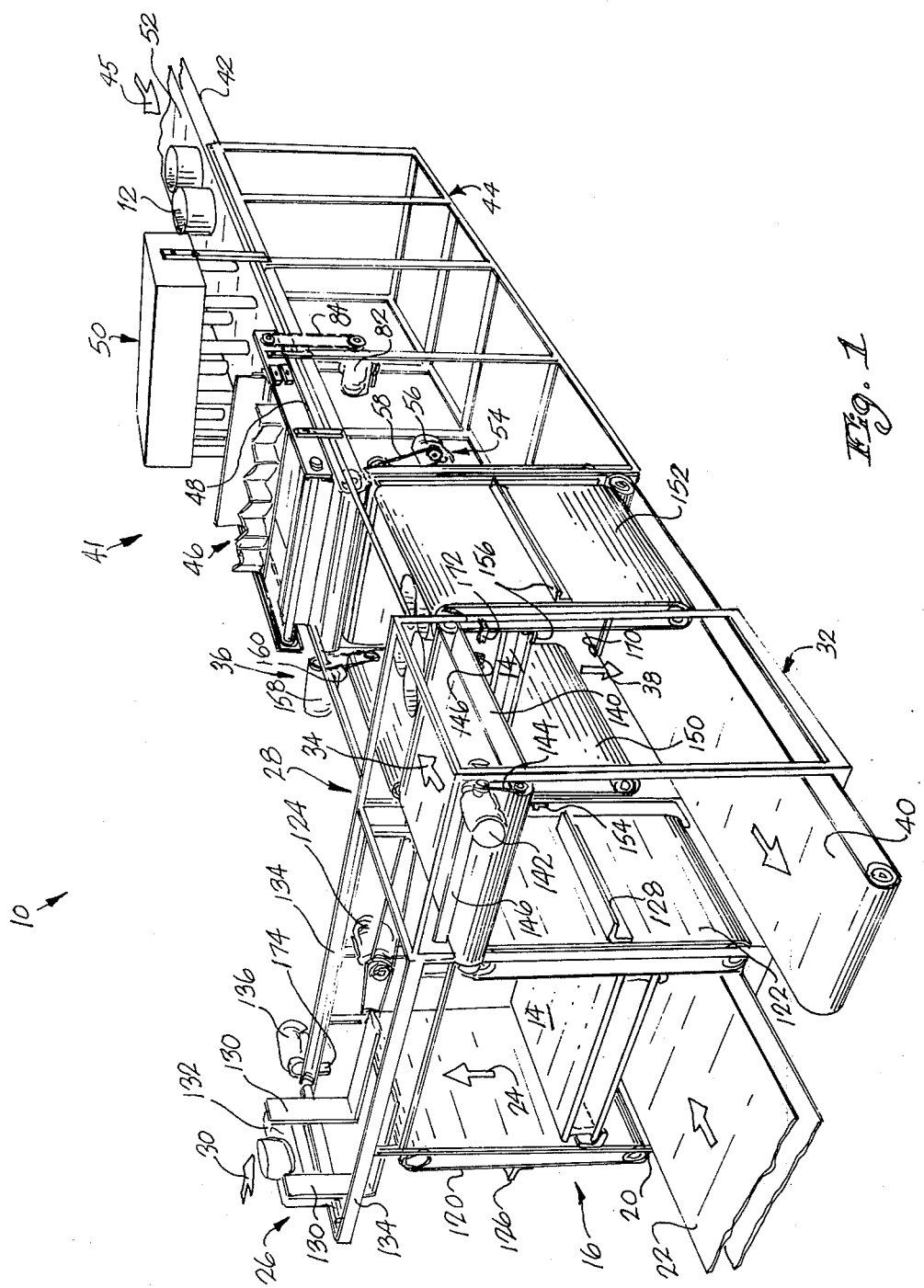
FIG. 1 is a perspective view of a palletizing apparatus constructed in accordance with the present invention.

Turning now to the drawings, wherein like components are designated by like reference numerals throughout the various figures, an apparatus 10, constructed in accordance with the present invention and illustrated in an overall perspective view in FIG. 1, is provided for receiving layered groups of articles such as, for example, hollow cylindrical beverage containers 12 and positioning these layered groups on a support member such as, for example, a pallet 14. In this regard, it is to be understood that the present invention, while being especially suitable for palletizing containers of the type described, is not limited thereto but may be provided for palletizing or otherwise generally stacking articles of any reasonable size and shape. However, for purposes of clarity, apparatus 10 will be described with regard to the manner in which it palletizes the aforedescribed containers and therefore will hereinafter be referred to as a palletizing apparatus.

As illustrated in FIG. 1, palletizing apparatus 10 includes an upright or vertically extending pallet feed elevator 16 which receives empty pallets 14 at its lower end or base 20 from a conventional conveyor mechanism 22 and which elevates the pallets upwardly in the direction of arrow 24. A fork-lift assembly 26, which is positioned adjacent the top of elevator 16, is adapted to transfer an empty pallet positioned thereat to a pallet transfer station 28 in the direction indicated by arrow 30. As illustrated, the pallet transfer station is located at the top of an adjacent upright or vertically extending apparatus section 32.

As indicated by arrow 34, an empty pallet positioned at transfer station 28 is transferred to the top of a second or palletizing elevator 36 which is positioned adjacent section 32. The transferred pallet is now in position to receive a first layer of containers, as illustrated best in FIG. 2. After receipt of this first layer, elevator 36 moves the pallet downwardly in the direction of arrow 38 and a distance substantially equal to the height of the containers. In this manner, a second layer of containers can be transferred on top of the first layer whereupon the pallet is again moved downward. As will be seen hereinafter, this procedure is repeated until the desired number of layers of containers are positioned on the pallet whereupon the loaded pallet is ultimately transported away for further handling by a conventional conveyor mechanism 40 extending out from under elevator 36 and apparatus section 32. In this regard, it should be readily apparent that a second empty pallet can be transferred from transfer station 28 to the top of elevator 36 as soon as the last container layer has been transferred to the pallet being loaded and that pallet moved down an incremental step equal to the height of the layer. In this manner, the time delay which would otherwise be required in completely removing a loaded pallet before initiating the loading of a subsequent pallet is eliminated.

Attention is now directed to the manner in which apparatus 10 receives containers 12 and transfers the same in layered groups to an awaiting pallet 14. For this purpose, apparatus 10 includes a receiving and transferring assembly 41 having a horizontally extending conveyor mechanism 42 supported at the top of another upright or vertically extending apparatus section 44 which is positioned adjacent palletizing elevator 36. Containers 12 are conventionally transported by means not shown to one end of conveyor 42 where they are conveyed in the direction of arrow 45 or towards the awaiting pallet. In this regard, it should be noted that the conveyor terminates adjacent palletizing elevator 36 and is substantially horizontally flush with an initially transferred pallet, as illustrated in FIG. 2.

In accordance with the present invention, an overhead sweep assembly 46, to be described in more detail hereinafter, is supported by apparatus section 44 and positioned directly above a portion of the conveyor 42, which portion is adjacent palletizing elevator 36 and which will hereinafter be referred to as sweep station or area 48. As will be seen hereinafter, assembly 46 is provided for arranging the containers 12 conveyed to sweep station 48 into a predetermined pattern and thereafter, in cooperation with conveyor 42, transferring the patterned group to an awaiting pallet 14.

After sweep station or area 48 has been completely filled with containers or after a predetermined number of containers have been received thereat, the passage taken by the containers entering the sweep station is blocked. This is accomplished by a passage inhibiting assembly 50 which will be described in more detail hereinafter and which, like assembly 46, is supported by apparatus section 44. Assembly 50 is positioned directly above conveyor 42, behind assembly 46 and substantially within a vertical plane separating the aforedescribed sweep station or area 48 and a receiving station or area 52 which comprises that portion of conveyor 42 behind assembly 50. As will be seen hereinafter, portions of the passage inhibiting assembly are movable between a lowered position for inhibiting passage of containers 12 from receiving station 52 to sweep station 48 and a raised position for allowing passage therebetween.

As will be illustrated, conveyor 42, sweep assembly 46 and passage inhibiting assembly 50 cooperate to transfer a first group of containers from sweep station 48 to an awaiting pallet 14 and before completion of this transfer step cooperate to begin the conveyance of a second group of containers from receiving station 52 to sweep station 48. In this manner, the overall time required for receiving containers and transferring layers thereof to pallet 14 is minimized.

Turning to FIGS. 2 to 5, attention is directed to the details of receiving and transferring assembly 41 and particularly to overhead sweep assembly 46 and passage inhibiting assembly 50, which, in accordance with the present invention, cooperate with conveyor 42 for receiving containers 12 and transferring the containers to an awaiting pallet 14 in a manner to be described hereinafter. In this regard, it should be noted that the conveyor is driven in the direction of arrow 45 by a drive assembly 54 which is illustrated in FIG. 1 and which includes a drive motor 56 and drive belt 58, the drive assembly being appropriately mounted to apparatus section 44 and conventionally connected to the conveyor for driving the latter.

For purposes of clarity, those conventional means for mounting or connecting various components discussed herein such as, for example, drive motor 56 and drive belt 58 will not be described unless they effect the operation of apparatus 10, it being understood that such means are well within the ordinary skill of the art.

Referring particularly to FIGS. 2, 3 and 4, the overhead sweep assembly 46, as illustrated, includes two elongated U-shaped channel members 60 and 62 which are provided for supporting most of the remaining components making up the assembly. The channel members, which are conventionally mounted to apparatus section 44 by a plurality of upright or vertical support bars 64 are positioned above and on opposite sides of conveyor 42 and extend in the direction of the conveyor the length of sweep station 48. A pair of cylindrical shafts 66 and 68 are mounted at their ends to opposite ends of channel members 60 and 62 by respective flanged bearings 70 and 72 which allow the shafts to freely rotate about their respective axes.

Each of the shafts 66 and 68 carry at their opposite ends and within the channels 60 and 62 respective sprockets 74 and 76 which are rigidly fixed to the shafts for rotation therewith. As illustrated best in FIGS. 2 and 3, each sprocket 74 cooperates with a sprocket 76 positioned on the same side of conveyor 42 for supporting and endless chain 78 which, as will be seen hereinafter, is adapted to move along a closed loop endless path defined by the chain. In this regard, a drive sprocket 80 rotatably mounted to the outside of channel member 60 is connected with a sweep assembly drive motor 82 by a connecting belt 84, the drive motor 82 being suitably mounted to apparatus section 44 as illustrated in FIG. 1. Sprocket 80 is connected to shaft 68 by a key element 86 so that, upon energization of motor 82, the sprocket and keyed shafted are rotated causing the chains 78 to move around both of the shafts 66 and 68 in the direction of arrow 88.

Two elongated and rectangular container sweep members 90 and 92, which are best illustrated in FIG. 4, are mounted to chains 78 in a manner to be described hereinafter and are positioned 180° apart along the path taken by the chains, that is, a distance of one-half of the overall path taken by the chains. The sweep members 90 and 92, which are perpendicular to channel members 60 and 62 and which extend substantially completely therebetween, are each suitably mounted at one horizontally extending end to the leg of an elongated T-bar, the T-bars being respectively designated by the reference numerals 94 and 96 as shown best in FIG. 4. Each of the T-bars, in turn, is mounted at opposite ends to the two chains 78 by pin plate attachments 98, one of which is generally illustrated in FIG. 2.

As illustrated best in FIG. 4, both of the sweep members 90 and 92 extend outwardly and away from chains 78 and are appropriately dimensioned so that their otherwise free horizontally extending ends are positioned slightly above conveyor 42 when the sweep members move along the lower half of the path defined by the chains. In this manner, as will be seen hereinafter, the sweep members are adapted to engage behind and with a substantial side portion of various ones of the containers positioned on the conveyor and within sweep area 48 for pushing those containers toward awaiting pallet 14 which, as stated hereinabove, is positioned adjacent the forward end of the conveyor.

Two elongated pattern forming members 100 and 102, which extend in a direction substantially perpendicular to channel members 60 and 62 and substantially completely therebetween, are, like sweep members 90 and 92, mounted at their horizontally extending ends to the legs of respective elongated T-bars 104 and 106 (FIG. 5), the latter being mounted at their opposite ends to chains 78 by pin plate attachments (not shown) similar to the aforementioned pin plate attachments 98. Like sweep members 90 and 92, the pattern formers 100 and 102 extend outwardly and away from chains 78 and are appropriately dimensioned so that their otherwise free horizontally extending ends are positioned slightly above conveyor 42 as they travel along the lower half of the path defined by the chains, this being best illustrated in FIG. 4. In addition, it should be noted that pattern former 100 is positioned slightly behind sweep member 90 in its movement about the aforedescribed sweep path and pattern former 102 is, in a similar manner, positioned behind sweep member 92 and 180°, along the path, from pattern former 100. As will be described in more detail hereinafter, each of the pattern formers is provided for blocking the passage taken by containers 12 in their movement from sweep station 48 to an awaiting pallet 14 until a desired number of containers have been accumulated within the sweep station and the sweep assembly initiated for transferring the accumulated containers to the pallet.

In order to position the containers conveyed to sweep station 48 in a predetermined array or pattern, each of the pattern formers 100 and 102 is fashioned as a plurality of integrally connected angle irons defining a plurality of transversely spaced pockets, each of which is suitably dimensioned to receive one of the containers. Accordingly, as the containers move along the conveyor 42 and into sweep station 48, those containers making up the leading row thereof enter into the pockets of, for example, pattern former 102 which, as illustrated in FIGS. 2 and 3, is positioned rearwardly of the forward terminating end of the conveyor. As seen in FIG. 5, after accumulation of the first row of containers within the pockets of pattern former 102, a second row is positioned behind the first row and staggered between the containers comprising the first row. The third and subsequent rows are, of course, staggered in the same manner. In this way, wastage of container space in the sweep station is minimized. In this regard, it should be noted that side rails (not shown) positioned on opposite sides of sweep station 48 and suitably mounted to upright support bars 64 would be provided for preventing the containers received in the sweep station from otherwise being diverted off the sides of the conveyor.

For reasons to be described hereinafter, sweep assembly 46 further includes a pair of vertically spaced limit switches 110 and 112 which are suitably mounted to channel member 60 and positioned slightly forwardly of shaft 68 as illustrated in FIG. 2. In this regard, the T-bars respectively supporting sweep members 90 and 92 include cam members or other suitable projections 114 (FIG. 4) connected therewith, each of these cam members being appropriately positioned for engaging and actuating one of the limit switches as an associated sweep member reaches a point along its path of movement adjacent that particular limit switch.

Attention is now directed to passage inhibiting assembly 50 which includes a drive arrangement 116 for moving a plurality of elongated and downwardly extending plunger elements 118 between a raised position, as indicated by solid lines in FIG. 4, and a lowered position, as indicated by dotted lines in the same figure. The drive arrangement may be operated in any suitable manner such as, for example, pneumatically, electrically or hydraulically. As illustrated best in FIG. 2, the plunger elements are arranged in two rows and staggered so that a particular element in one row is positioned between two elements of the second row. As stated hereinabove, assembly 50 is positioned directly above conveyor 42 and substantially within a vertical plane separating the aforedescribed sweep station 48 and receiving station 32, that is, directly behind sweep assembly 46. In this regard, a pair of upright support members 120 may be provided for suitably mounting the assembly to apparatus section 44 in the aforedescribed position. With assembly 50 so positioned, the plunger elements 118 when in their lowered position extend to a point slightly above the conveyor 42 for inhibiting passage of containers from the receiving station to the sweep station and when in their raised position allow passage therebetween, this being best illustrated in FIG. 4. Where two rows of plunger elements are shown, it is to be understood that any reasonable number thereof may be provided.

With receiving and transfer assembly 41 constructed in the aforedescribed manner, attention is now directed to the manner in which it operates. In this regard, it will be assumed that the assembly is initially in the position shown in the FIGS. 2 and 4 and that no containers have, as of yet, been transferred from the receiving station to the sweep station or transferred from the latter to an awaiting pallet 14. Operationally, conveyor 42, which is adapted for continuous movement in the direction of arrow 45, conveys a plurality of containers 12, received at the receiving station, under passage inhibiting assembly 50 and into sweep station 48 where they are prevented from going any further by pattern former 102 which, in addition, positions the containers in the aforedescribed pattern. As is generally the case, the operator allows the sweep station to be completely filled so that the containers begin to backup behind passage inhibiting assembly 50. At this time, the operator by appropriate means (not shown) may energize the receiving and transfer assembly which initiates movement of chains 78 in the direction of arrow 88 so that sweep members 90 and 92 and pattern formers 100 and 102 begin to move in the same direction and along the path defined by the chains.

At the same time that chains 78 begin to move, drive arrangement 116 of passage inhibiting assembly 50 is energized for moving plunger elements 118 from their retracted or raised position to their lowered position whereupon the plunger elements enter into the two rows of containers which are positioned directly under the assembly and which like the other containers being transferred have their top ends open. In this manner, those containers receiving the plunger elements and any containers therebehind are blocked from passing into the sweep station even though the conveyor 42 continues to move. In the mean time, pattern former 102 has moved around and out of the path between the conveyor 42 and pallet 14 for allowing the containers accumulated within sweep station 48 to move in the direction of the pallet. Simultaneously, the sweep member 90 which is travelling along the path defined by chains 78 at a faster rate than the movement of conveyor 42, is moved directly behind and in engagement with the accumulated containers. In reaching this position, sweep member 90 actuates the lower limit switch 112 which, in turn, is connected to appropriate controls (not shown) for actuating assembly 50 and raising the plunger elements 118. Accordingly, the containers within the receiving station 32 begin to move into the sweep station directly behind pattern former 100 which, as stated above, is positioned directly behind sweep member 90. As they enter, sweep member 90 continues to move forwardly pushing the first group of containers onto pallet 14. When this sweep member reaches the position previously assumed by sweep member 92, the last-mentioned sweep member reaches the position previously assumed by sweep member 90 and actuates the limit switch 110 for stopping operation of the entire assembly. At this point, the second pattern former 100 is in the position previously assumed by pattern former 102 for blocking passage of the newly received group of containers and forming them in the same pattern. In addition to stopping operation of the receiving and transfer assembly, actuation of limit switch 110 initiates downward movement of the pallet 14 positioned within elevator 36 so that the pallet may receive a second layer of containers, this being described in more detail hereinafter. This procedure is repeated each time the operator energizes assembly 41.

It should be readily apparent from the aforedescribed operational description, that a short period of time is required for transferring groups of containers from receiving station 52 to the sweep station and ultimately onto an awaiting pallet 14.

Returning to FIG. 1, attention is redirected to feed elevator 16 which, as illustrated, includes two vertically extending and spaced apart conveyor belts 120 and 122 which are suitably mounted to the frame defining the elevator on opposite sides of conveyor mechanism 22 and which are respectively driven counter-clockwise and clockwise, as viewed in FIG. 1, by an appropriately connected and mounted drive assembly including a drive motor 124. Both of the belts 120 and 122 carry a plurality of suitably connected and horizontally extending flange supports 126 and 128, respectively, each of the flange supports 126 being in horizontal alignment with an associated flange support 128 and in confronting relationship therewith. In this manner, as the belts are driven in the manner described, a pair of aligned and confronting flange supports 126 and 128 are adapted to move under an empty pallet positioned at the bottom of the feed elevator by conveyor 22 and raise the pallet in the direction of arrow 24, as illustrated in FIG. 1. This procedure may be repeated for raising subsequent empty pallets by the remaining pairs of aligned support members.

While only two pairs of aligned support members 126 and 128 are shown in FIG. 1, it is to be understood that a larger number thereof may be included so that more than two pallets may be stored in the feed elevator, or the same aligned members may carry a plurality of pallets. In addition, while the arrangement comprising elevator 16 is shown to include conveyors 120 and 122 and support members 126 and 128, it is to be understood that any suitable means such as, for example, chain and sprocket arrangements may be provided for accomplishing the same results.

Attention is now directed to fork lift assembly 26, which as stated hereinabove, is provided for transferring an empty pallet positioned at the top of elevator 16 to transfer station 28. In this regard, assembly 26 includes a pair of spaced-apart L-shaped fork members 130 having their vertical leg portions mounted to a fork-lift base 132 and their horizontal leg portions positioned adjacent the top of elevator 16 and extending toward transfer station 28. Base 132 is suitably mounted, on opposite sides thereof, to a pair of spaced apart tracks 134 which are supported by the elevator 16 and which extend to a point adjacent transfer station 28. A conventional drive assembly including drive motor 136 mounted on the outside of one of the tracks is provided for reciprocally moving the forklift assembly between the position in which it is shown in FIG. 1 and a point adjacent transfer station 28. At the same time, the fork-lift assembly includes conventional means (not shown) for raising and lowering the fork members a slight distance. In this manner, after an empty pallet has been positioned at the top of elevator 16, the latter may be transferred to transfer area 28 by energizing motor 136 and causing the forklift assembly to move in the direction of arrow 30. In so doing, the fork members enter between the opposite sides of the pallet, lift the pallet slightly upwardly and move the same to the transfer station where the pallet is again lowered thereon and the fork-lift assembly moved back to its initial position for repeating the operation with a subsequent pallet.

The transfer station 28, as illustrated in FIG. 1, includes a horizontally extending conveyor mechanism 140 mounted to the top of apparatus section 32 and driven in the direction of arrow 34 by an appropriately connected and mounted drive assembly including drive motor 142 and drive belt 144. The Conveyor 140 is positioned to receive an empty pallet from elevator 16 and, upon energization of motor 142, moves the pallet thereon towards the top of palletizing elevator 36. In this regard, a plurality of elongated angled flange members 146 extending across the conveyor and suitably mounted thereto are provided for engaging behind the received pallets and pushing the same onto the top of the palletizing elevator.

The palletizing elevator 36, like feed elevator 16 may include two vertically extending and spaced apart conveyor belts 150 and 152 which support a plurality of similar aligned flange supports 154 and 156 (only one pair being shown) and which are respectively driven counter-clockwise and clockwise (as viewed in FIG. 1) by an appropriately connected and mounted drive assembly including drive motor 158 and drive belt 160. In this manner, upon energization of motor 158, a pair of aligned flange supports 154 and 156 carry a pallet supporting containers 12 downward in the direction of arrow 38.

For reasons to be described hereinafter, palletizing elevator 36 includes a conventional arrangement (not shown) which initiates a signal when the pallet positioned within the elevator moves downwardly an increment substantially equal to the height of one layer of containers positioned thereon. This arrangement may include, for example, a light source and photoelectric cell positioned on opposite sides of the elevator so as to initiate the aforestated signal after the last layer has passed therebetween. In this manner, the pallet may be moved downwardly one increment and stopped so that a subsequent layer can be placed thereon.

With feed elevator 16, fork-lift assembly 26, transfer station 28, and palletizing elevator 36 constructed in the aforedescribed manner, attention is now directed to the manner in which they operate in conjunction with container receiving and transfer assembly 41. In this regard, as stated hereinabove, upon actuation of assembly 41 by the operator, conveyor mechanism 42, sweep assembly 46 and passage inhibiting assembly 50 cooperate to transfer a first layer of containers 12 onto a pallet 14 positioned at the top of palletizing elevator 36. At the end of this operation, it was noted that limit switch 110 comprising part of the sweep assembly was actuated for terminating operation of the receiving and transfer assembly.

In addition to terminating operation of assembly 41, actuation of the limit switch 110, through suitable controls (not shown) energizes palletizing elevator drive motor 158 for initiating movement of pallet 14 downwardly in the direction of arrow 38. When the pallet has moved down a distance substantially equal to the height of the containers positioned thereon, the aforedescribed photoelectric cell arrangement or other suitable arrangement is triggered for de-energizing motor 158 and causing the pallet to stop. The pallet is now in position to receive a second layer of containers from receiving and transfer assembly 41 and operation of the latter may be repeated. In this regard, it should be noted that a layer of cardboard or other suitable material, which is often referred to as a chipboard, may be either manually or mechanically positioned between the first and subsequent layers of containers for providing greater support stability thereto.

After the desired number of layers have been transferred onto pallet 14, it is readily apparent that the latter is at a predetermined point along elevator 36. Accordingly, a limit switch or other similar actuating device 170 which is appropriately mounted to the frame defining the palletizer elevator may be appropriately positioned so that the pallet or other suitable means moving with the pallet actuates the limit switch when the pallet reaches that point. In this manner, the aforedescribed photoelectric cell arrangement may be by-passed for allowing the loaded pallet to continue its movement downward and onto conveyor mechanism 40 which thereafter carries the loaded pallet away. In this regard, limit switch 170 or another suitable limit switch (not shown) upon being actuated may be provided for energizing the transfer station drive motor 142 so as to cause an empty pallet positioned in the transfer station to be moved to the top of palletizing elevator 36. In this regard, a limit switch or other suitable actuating device 172 may be mounted to apparatus section 32 and positioned directly under the forward end of transfer conveyor 140. Accordingly, after the flange 146 has completely transferred a pallet from transfer station 28 to palletizing elevator 36 and during its initial movement along the lower side of conveyor 140, it will actuate the limit switch 172 causing de-energization of motor 142 for stopping transfer station conveyor 140 and energization of fork-lift motor 136 so that the fork-lift assembly may transfer another pallet from the feeder elevator to the transfer station. Another limit switch 174 may be suitably mounted to one of the tracks 134 which guides the fork-lift assembly and positioned for actuation by the fork-lift assembly when the latter returns to its initial position. In this way, upon actuation of the limit switch 174, operation of the fork-lift assembly may be terminated by de-energizing motor 136 and feed elevator drive motor 124 may be energized for lifting another pallet to the top of the elevator, a limit switch (not shown) being appropriately mounted and positioned for terminating operation of the feeder elevator when the pallet reaches the top thereof.

It should be readily apparent that the overall operation of palletizing apparatus 10 including operation of receiving and transfer assembly 41 requires various control devices such as, for example, relays to be connected with the various limit switches and drive motors as well as the aforedescribed photoelectric cell arrangement. Because such control devices and the manner in which they are connected would be readily within the skill of the art in view of the aforedescribed operation, a description thereof is deemed unnecessary, the same being readily providable by one with ordinary skill in the art. In addition, although a perferred embodiment of the present invention has been illustrated and described, it is anticipated that various changes and modification will be apparent to those skilled in the art and that such changes may be made without departing from the true scope of the present invention as defined by the appended claims.

What is claimed is:

1. An assembly for transferring articles from a first area to a second area, said assembly comprising: support means adapted to be moved along a closed loop endless path; first means connected with said support means and movable with said support means along said path, said first means being adapted for engagement with at least one of said articles when said one article is within said first area and when said first means is moved along a predetermined portion of said path whereby said first means moves said one article by pushing towards said second area; second means connected with said support means a distance of approximately one-half of said path from said first means and movable therewith, said second means being adapted for engagement with at least a subsequent article received within said first area when said second means is moved along a predetermined portion of said path for moving said subsequent article towards said second area; third means connected with said support means, movable therewith and positioned directly behind said first means, said third means being adapted for blocking the transfer path between said first and second areas when said third means is at a predetermined point along said fixed path; and fourth means connected with said support means, movable therewith and positioned directly behind said second means a distance of approximately one-half of said fixed path from said third means, said fourth means being adapted for blocking said transfer path when said fourth means is at a predetermined point along said fixed path.

* * * * *